(12) United States Patent
Boone

(10) Patent No.: US 8,215,592 B2
(45) Date of Patent: Jul. 10, 2012

(54) EGC COMPLIANT WIRE MESH CABLE TRAY SYSTEM

(75) Inventor: Jeffrey A. Boone, Newtown Square, PA (US)

(73) Assignee: OBO Bettermann of North America, King of Prussia, PA (US)

( * ) Notice: Subject to any disclaimer, the term of this patent is extended or adjusted under 35 U.S.C. 154(b) by 765 days.

(21) Appl. No.: 12/323,565

(22) Filed: Nov. 26, 2008

(65) Prior Publication Data

US 2010/0126900 A1    May 27, 2010

(51) Int. Cl.
*F16L 3/00* (2006.01)
(52) U.S. Cl. ......... 248/49; 248/58; 248/175; 174/40 CC
(58) Field of Classification Search .................... 248/49, 248/41, 58, 225.1, 175
See application file for complete search history.

(56) References Cited

U.S. PATENT DOCUMENTS

| | | | |
|---|---|---|---|
| 2,656,999 A | 10/1953 | Ullberg | |
| 3,053,358 A | 9/1962 | Gross | |
| 3,137,468 A | 6/1964 | Meinders | |
| 3,618,882 A | 11/1971 | Podedworny | |
| 4,276,332 A * | 6/1981 | Castle | 428/34.1 |
| 4,432,519 A | 2/1984 | Wright | |
| 4,443,732 A * | 4/1984 | Hayashi | 310/343 |
| 5,730,400 A * | 3/1998 | Rinderer et al. | 248/68.1 |
| 5,839,476 A | 11/1998 | Blase | |
| 5,839,702 A | 11/1998 | Jette | |
| 5,939,680 A | 8/1999 | Gretz | |
| 6,000,181 A | 12/1999 | Wheeler | |
| 6,076,779 A | 6/2000 | Johnson | |
| 6,082,690 A | 7/2000 | Durin | |
| 6,115,984 A | 9/2000 | Paradis | |
| 6,313,405 B1 | 11/2001 | Rinderer | |
| 6,585,195 B2 | 7/2003 | Wentworth | |
| 6,590,154 B1 * | 7/2003 | Badey et al. | 174/480 |
| 6,609,684 B2 | 8/2003 | Van Scoy | |
| 6,926,236 B2 | 8/2005 | Jette | |
| 7,073,299 B1 | 7/2006 | diGirolamo et al. | |
| 7,293,392 B2 | 11/2007 | Krumbacher | |
| 7,373,759 B1 | 5/2008 | Simmons | |
| 7,380,757 B2 | 6/2008 | Paunescu | |
| 7,458,188 B2 | 12/2008 | Mears | |

(Continued)

FOREIGN PATENT DOCUMENTS

EP    0930685    7/1999

(Continued)

OTHER PUBLICATIONS

Supplementary European Search Report and European Search Opinion in EP09829781.5, dated Sep. 13, 2011 (6 pages).

*Primary Examiner* — Anita M King
*Assistant Examiner* — Monica Millner
(74) *Attorney, Agent, or Firm* — Dinsmore & Shohl, LLP

(57) ABSTRACT

A component for bends and elevation offsets modifications to a wire mesh cable tray system that maintains the cross-sectional area and conductivity of the original wire mesh cable tray before the bends and elevation offsets modifications is presented. By maintaining the cross-section area, equipment-ground conductor compliance is preserved. The component can be easily and quickly modified as needed while maintaining the cross-sectional area of the wire mesh cable tray system. The component can be modified and installed either by the manufacturer or in the field by a technician.

16 Claims, 4 Drawing Sheets

U.S. PATENT DOCUMENTS

| | | |
|---|---|---|
| 7,462,785 B1 | 12/2008 | Davis |
| 7,484,351 B2 | 2/2009 | Harada |
| 7,546,987 B2 | 6/2009 | Sinkoff |
| 7,586,036 B2 * | 9/2009 | Davis et al. ............... 174/40 CC |
| 7,742,675 B2 | 6/2010 | Sayres |
| 7,825,342 B2 | 11/2010 | Caveney |
| 7,841,566 B2 | 11/2010 | Kellerman |
| 7,848,608 B2 | 12/2010 | Owens |
| 7,885,503 B2 | 2/2011 | Wentworth |
| 2003/0116682 A1 | 6/2003 | Finco |
| 2004/0144898 A1 | 7/2004 | Spagnoli |
| 2005/0103517 A1 * | 5/2005 | Canepa ........................ 174/68.3 |
| 2006/0038091 A1 * | 2/2006 | Winn et al. ..................... 248/49 |

FOREIGN PATENT DOCUMENTS

| | | |
|---|---|---|
| FR | 2727186 | 5/1996 |
| KR | 20-0257931 | 12/2001 |
| KR | 10-0641406 | 11/2006 |

* cited by examiner

EGC COMPLIANT WIRE MESH CABLE TRAY SYSTEM

BACKGROUND

The present disclosure relates, generally, to a wire mesh cable tray system and, in particular, to a component for a wire mesh cable tray that can be installed in the field to maintain equipment ground conductor (EGC) compliance for the wire mesh cable tray system.

Generally, a cable tray system is a rigid structural support system used to securely and mechanically support cables and wires across open spans. One type of cable tray is a wire mesh cable tray. Typically, these wire mesh cable trays are used at a job site for field adaptable support systems for a variety of cables such as, for example, low voltage, telecommunication and fiber-optics cables supporting analog and digital signals. In addition, the cables may be for applications that require different operational electrical voltages. The wire mesh cable trays are installed on short support spans between about four to about eight feet. These systems are typically steel wire mesh and zinc plated. Wire mesh cable trays have standard widths of 2, 4, 6, 8, 12, 16, 18, 20 and 24 inches, standard depths of 1, 2 and 4 inches, and a standard length of about 118 inches.

The manufacturing standard requirements for wire mesh cable trays are govern by the National Electrical Manufacturers Association (NEMA) and tested by establishments such as Underwriters Laboratories (UL) and the Canadian Standards Association (CSA). Additionally, installation procedures and practices are governed by a variety of codes, such as, for example, National Electrical Code (NEC). An UL classification indicates that the UL has tested the product and found its use suitable as an equipment-grounding conductor (EGC) and found that the product is intended for assembly in the field and for use in accordance with NFPA-70, National Electrical Code. In addition, the NFPA-70, National Electrical Code section 392.7 states a metallic cable system comprised of either steel or aluminum which is to be used as an EGC should be installed as per Table 392.7(b). In order to comply with Table 392.7(b) and to be certified as EGC compliant, the wire mesh trays need to 1) meet minimum cross-sectional area requirements as designated under Table 392.7(b); 2) not exceed a net resistance; and 3) be joined by mechanical connection.

A problem arises out in the field when the wire mesh cable tray systems need to be modified to adjust to the environment into which they are going to be installed. Such modifications can be bends and elevation offsets. The field installation technician may cut sections of the wire mesh cable trays out, bend, or form, the wire mesh cable tray into the desired configuration. For example, if a large radius bend in the wire mesh cable tray system is needed, the field installation technician would remove the wire mesh from alternate cross-sectional sections of the wire mesh tray along the longitudinal axis. The technician would then bend the ends of the wire mesh cable tray inward to form the radius of the bend as illustrated in FIG. 1. The technician can then secure the remaining cross-sectional sections of the wire mesh cable tray with connectors, such as, for example, expanding splice connectors and/or tee bolt assemblies, to maintain the new configuration. However, by cutting, bending or modifying the sections of the wire mesh cable trays, the cross-sectional area of the wire mesh cable trays can change. These environmental modifications can result in the wire mesh cable tray system no longer adhering to or complying with the EGC standards to which it had been manufactured.

Therefore, there is a need for components, either field-installed or manufactured, to be used with the wire mesh cable tray systems that maintain the cross-sectional area of the wire mesh cable tray as well as maintain the conductivity during bend and elevation offset modification to wire mesh cable tray system as required for the wire mesh cable tray system to comply with EGC standards.

BRIEF SUMMARY

According to the present disclosure, a component for a wire mesh cable tray system that maintains the cross-sectional area of the wire mesh cable tray system in bend and elevation offset modifications to the wire mesh cable tray is presented. By maintaining the cross-section area, equipment-ground conductor compliance is preserved.

In accordance with one embodiment, the component can be easily and quickly modified while maintaining the cross-sectional area of the wire mesh cable tray system.

In accordance with another embodiment, the component can be modified and installed either by a manufacturer or in the field by a technician while maintaining the cross-sectional area.

Accordingly, it is a feature of the embodiments of the present disclosure to present a component to be used with a wire mesh cable tray system to maintain the cross-sectional area of the wire mesh cable tray system in bend and elevation offset modification to the wire mesh cable tray. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

As discussed above, the manufacturing standard requirements for wire mesh cable trays are govern by the NEMA and tested by establishments such as UL and CSA. In order for the wire mesh cable tray systems to comply with the installation standards set forth in NFPA-70, NEC, Table 392.7(b), the wire mesh cable trays should: 1) meet minimum cross-sectional area requirements as designated under Table 392.7(b); 2) not exceed a net resistance, the UL tests the conductivity of the wire mesh tray system using NEMA VE-1-2002, section 5.1.2 which requires a net resistance of the trays connection to be no greater than 0.00033 ohms; and 3) be joined by a mechanical connection.

In one exemplary embodiment, a component can be attached and installed with the wire mesh cable tray in the situation where the wire mesh cable tray had been modified to fit the environment with bends and elevation offsets. The component can provide the same cross-sectional area and conductivity as the original wire mesh cable tray (i.e., before the wire mesh cable tray was cut and bent to adapt to the bends and elevation offsets in the environment) that was designed, tested and approved by the UL or CSA. This component can help maintain the EGC integrity of the wire mesh cable tray while allowing and maintaining the field installation modification flexibility of the wire mesh cable tray system.

Figure 1:
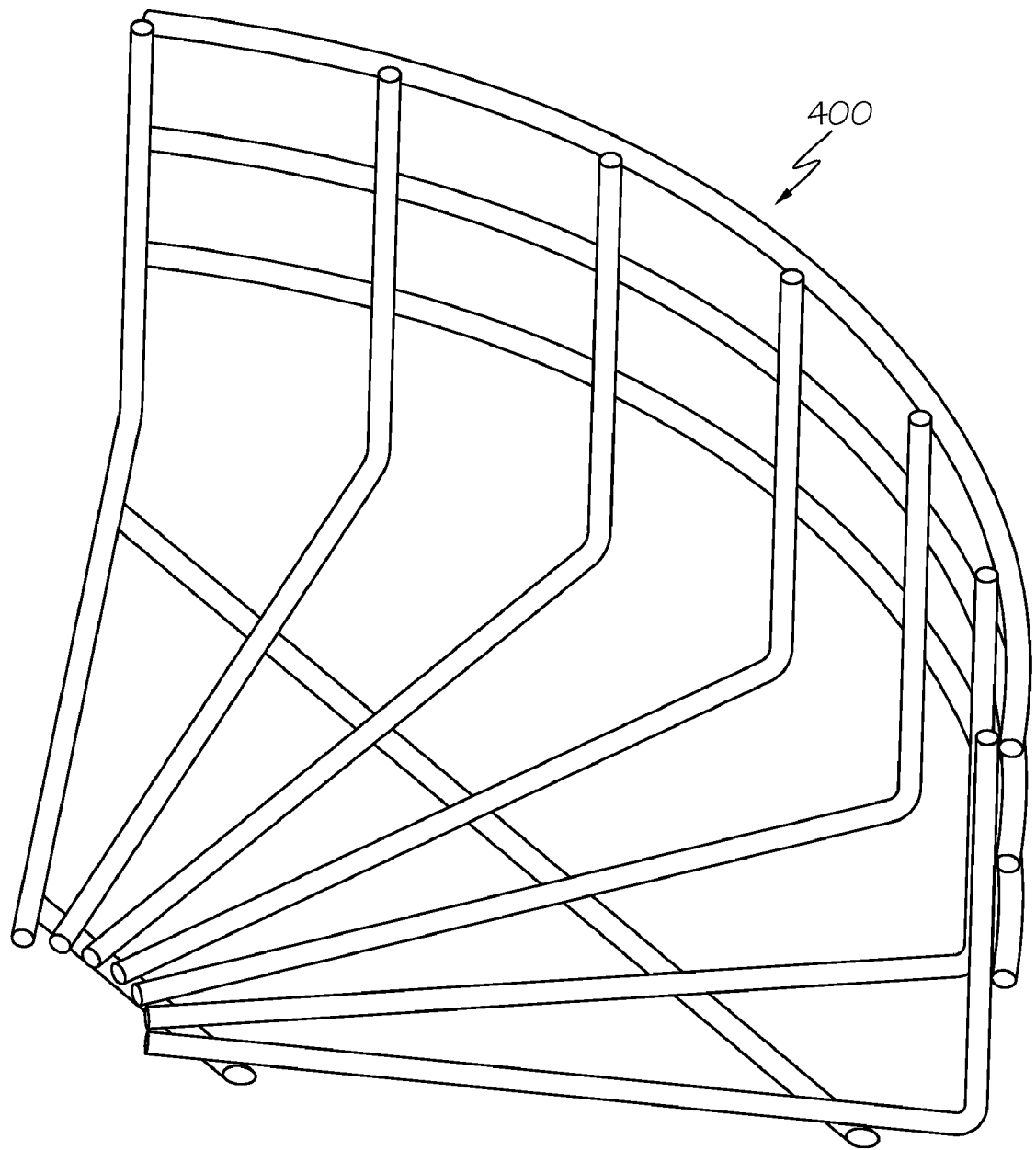
FIG. 1 illustrates a wire mesh tray having a 90° bend.
Figure 2:
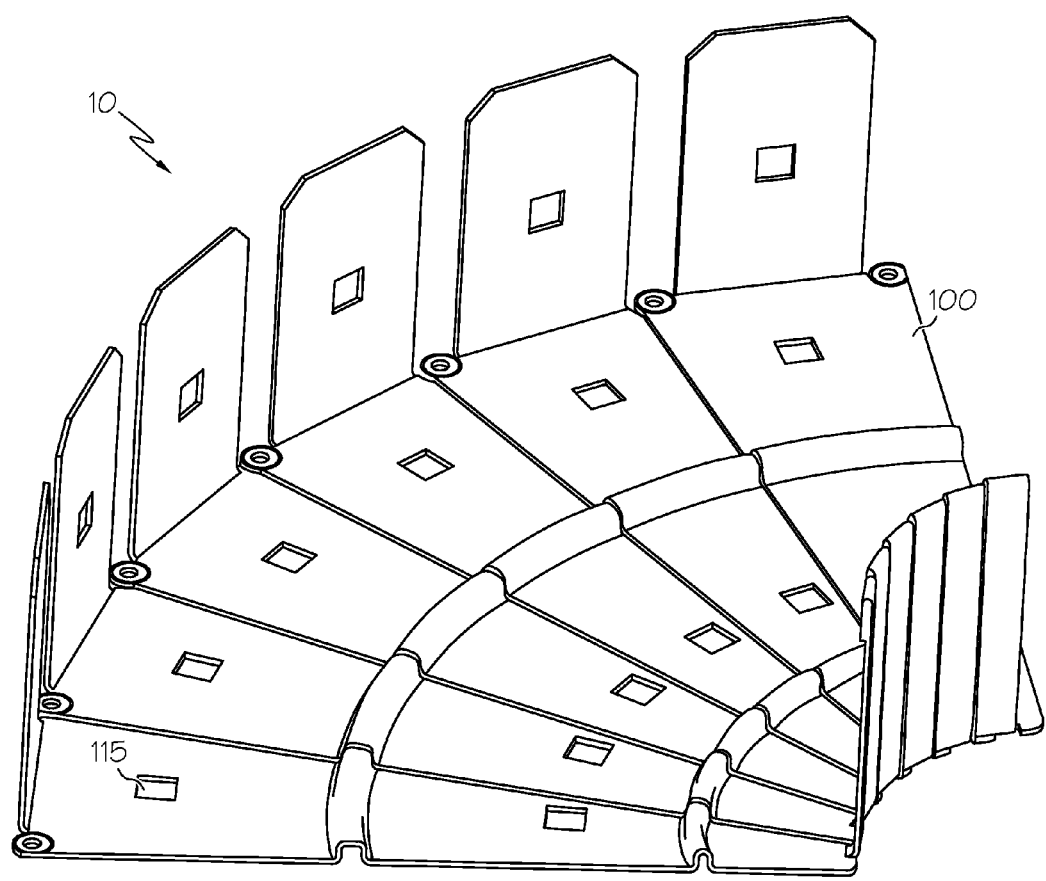
FIG. 2 illustrates a perspective view of a plurality of wedge-shaped pieces forming a bend component according to an embodiment of the present disclosure.

Referring initially to FIG. 2, a traditional wire mesh cable tray to be modified can have an original height between approximately 2 inches (approximately 5 centimeters) to about 6 inches (about 15.25 centimeters), an original width between about 4 inches (about 10.16 centimeters) to about 14 inches (about 35.56 centimeters), and an original length of approximately 9.735 feet (approximately 3 meters). FIG. 2 illustrates a component 10 to be installed with a wire mesh cable tray system after the system has modified to fit its environment with bends and elevation offsets. The component 10 can accommodate bends in the wire mesh cable tray system from substantially 0° to substantially 360° while maintaining the EGC required cross-sectional area of the original wire mesh cable tray system. The component 10 can be comprised of, for example, galvanized sheet metal such as, for example, steel, aluminum, or any other suitable metal. In one exemplary embodiment, the galvanized sheet metal can be approximately 0.05 inches (approximately 0.127 centimeter) thick. In one exemplary embodiment, the component 10 can be comprise of at least one wedge-shaped piece 100. In order to achieve the desired radius, or arc, of the bend in the wire mesh cable tray system, wedge-shapes pieces 100 can be added or removed from the component 10 as will be described below.

Figure 3:
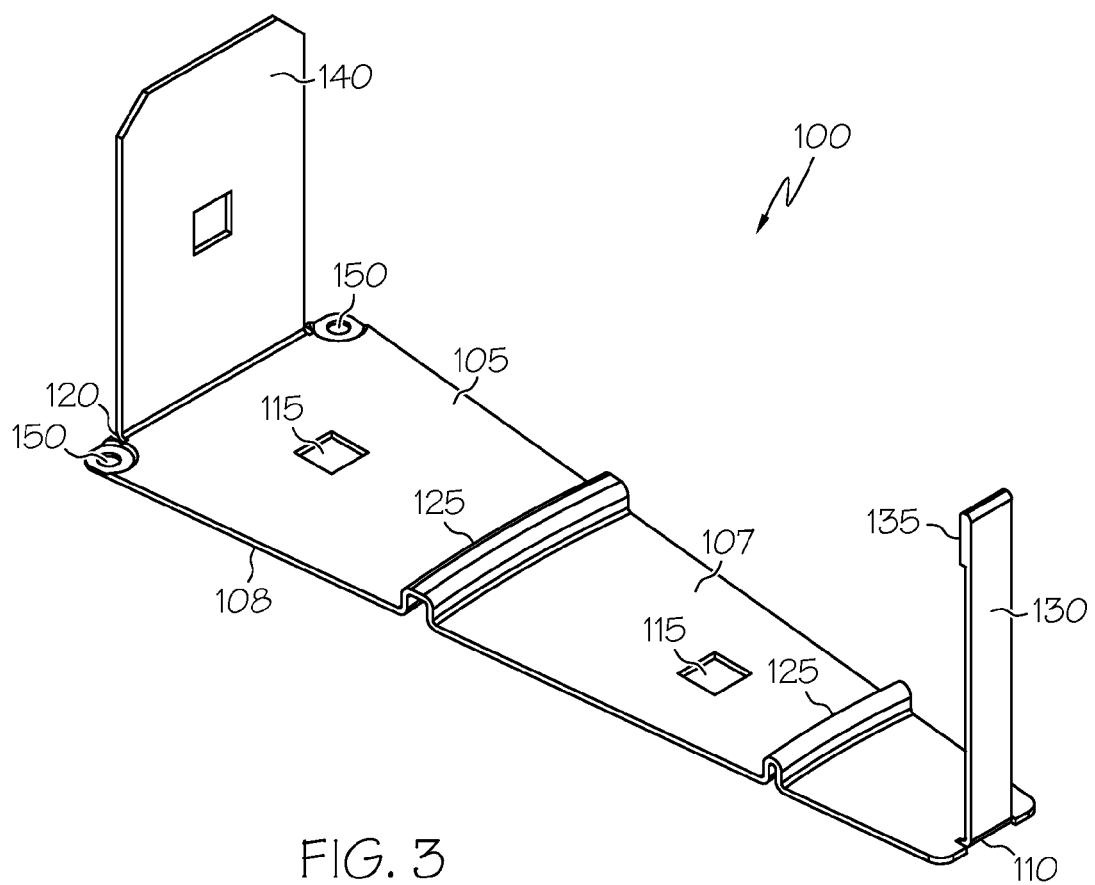
FIG. 3 illustrates a single wedge-shape piece that makes up a bend component according to an embodiment of the present disclosure.

One wedge-shaped piece 100 of the component 10 is illustrated in FIG. 3. The wedge-shaped piece 100 can comprise a bottom 105 having an upper surface 107 and a lower surface 108, a first edge 110 and second edge 120. In one exemplary embodiment, the first edge 110 can have a width of about 0.75 inches (about 2 centimeters) while the second edge 120 can have a width of about 2 inches (about 5 centimeters). In one exemplary embodiment, the overall length of each wedge-shaped piece 100 can be about 6 inches (about 15.25 centimeters). In one embodiment, the bottom 105 of each wedge-shaped piece 100 can be perforated with apertures 115. The apertures 115 can provide openings to accept and attach installation and/or attachment hardware as needed. In one exemplary embodiment, the geometric shape of the apertures 115 can be rectangular. In one exemplary embodiment, the rectangular apertures 115 can have sides that can be approximately 0.3 inches (approximately 0.75 centimeter). However, any suitable shaped aperture 115 known in the art may be used. Additionally, any number of apertures 115 can be formed in the bottom 105 as needed. In one embodiment, two apertures 115 can be formed in the bottom 105 of the wedge-shaped piece 100 that are centered substantially equidistance from each other and substantially equidistance from the first edge 110 and the second edge 120. In one exemplary embodiment, a first aperture 115 can centered approximately 1 inch (approximately 2.5 centimeters) from the second edge 120 and a second aperture 115 can be centered approximately 3.75 inches (approximately 9.5 centimeters) from the second edge 120.

In one embodiment, the lower surface 108 of the bottom 105 may also have at least one row of rounded indentions 125 that can protrude into the upper surface 107 and can run a curved width of the wedge-shaped piece 100. In one exemplary embodiment, the rounded indentions can protrude approximately 0.15 inches (approximately 0.4 centimeter) from the upper surface 107. In one embodiment, the wedge-shaped piece 100 may have two rows of rounded indentions 125 that are centered substantially equidistance from each other and substantially equidistance with the first edge 110 and the second edge 120. In one exemplary embodiment, the rounded indentions 125 can have a radius of about 0.1 inches (about 0.25 centimeter). In one exemplary embodiment, the row of rounded indentions 125 can be used to strengthen the wedge-shaped piece 100. In another exemplary embodiment, the row of rounded indentions 125 can be used for sizing the bend and can be used to maintain electrical compliance. Additionally, the row of rounded indentions 125 may also help guide the cables, or wires of the wire mesh cable tray system.

The first edge 110 and the second edge 120 of the wedge-shaped piece 100 can each have a substantially rectangular panel 130, 140 projecting substantially orthogonally up from the bottom 105. In one exemplary embodiment, the first edge panel 130 can have a width of about 0.3 inches (about 0.75 centimeter) and can be substantially centered in the middle of the first edge 110. The first edge panel 130 can be approximately 2.20 inches (approximately 5.6 centimeters) tall. In one embodiment, the first edge panel 130 can have a small flange 135 projecting from the top edge of the rectangular first edge panel 130 towards the second edge panel 140. In an exemplary embodiment, the small flange 135 can have a length of approximately 0.35 inches (approximately 1 centimeter). The small flange 135 can form a "hem" with the small flanges 135 of adjacent wedge-shaped pieces 100. This hem can help eliminate the small and potentially sharp edge of the top of the first edge panel 130. In one embodiment, the hem can also provide electrical connectivity between the adjoining wire mesh cable trays.

In one exemplary embodiment, the rectangular second edge panel 140 projects substantially orthogonally from the second edge 120 can be about 2.20 inches (about 5.6 centimeters) tall and about 1.4 inches (about 3.6 centimeters) wide and can be approximately centered in the middle of the second edge 120. In one embodiment, the second edge panel 140 can be perforated in order to accept installation and/or attachment hardware as needed. In one embodiment, the perforations in the second edge panel 140 can be rectangular. In one exemplary embodiment, the rectangular perforation can have sides approximately 0.3 inches (approximately 0.75 centimeter) long and be located about 1 inch (about 2.5 centimeters) from bottom 105 of the wedged-shape piece 100. In one embodiment, the upper corners of the second edge panel 140 can be beveled. In one exemplary embodiment, the upper corners of the second edge panel 140 can be beveled at an approximately 45° angle. In one exemplary embodiment, the substantially rectangular panels 130, 140 can be folded towards the bottom 105 for easy storage and transport. In another exemplary embodiment, the substantially rectangular panels 130, 140 can be remove, either in the field or during manufacture, as needed.

One wedge-shaped piece 100 can be connected and interlocked to another wedge-shaped piece 100 to form the desired bend, or arc, of the component 10. In one exemplary embodiment, the wedge-shaped pieces 100 can be interlocked by round-head tubular rivets that pass through grommets 150 located at the corners of the second edge 120. In another exemplary embodiment, the wedge-shaped pieces 100 can be snapped together. The component 10 can be assembled in the field or can be pre-assembled at a manufacturing site. In one exemplary embodiment, a field installation technician can the adapt the component 10 to fit with a wire mesh cable tray system that has been modified during installment by the technician to fit into the environment at the field site. For example, additional wedged-shaped pieces 100 may be added to the component 10 at the field site by the technician to form the desired bend, or arc, or elevation offset of the component 10. Alternatively, the wedged-shaped pieces 100 may be removed from the component 10 at the field site by a technician to form the desired bend, or arc, or elevation offset of the component 10. The wedge-shaped pieces 100 may be connected to form a planar curved surface as shown in FIG. 2. Alternatively, the wedge-shaped pieces 100 may spiral to create a curved, helical elevation offset component.

Figure 4:
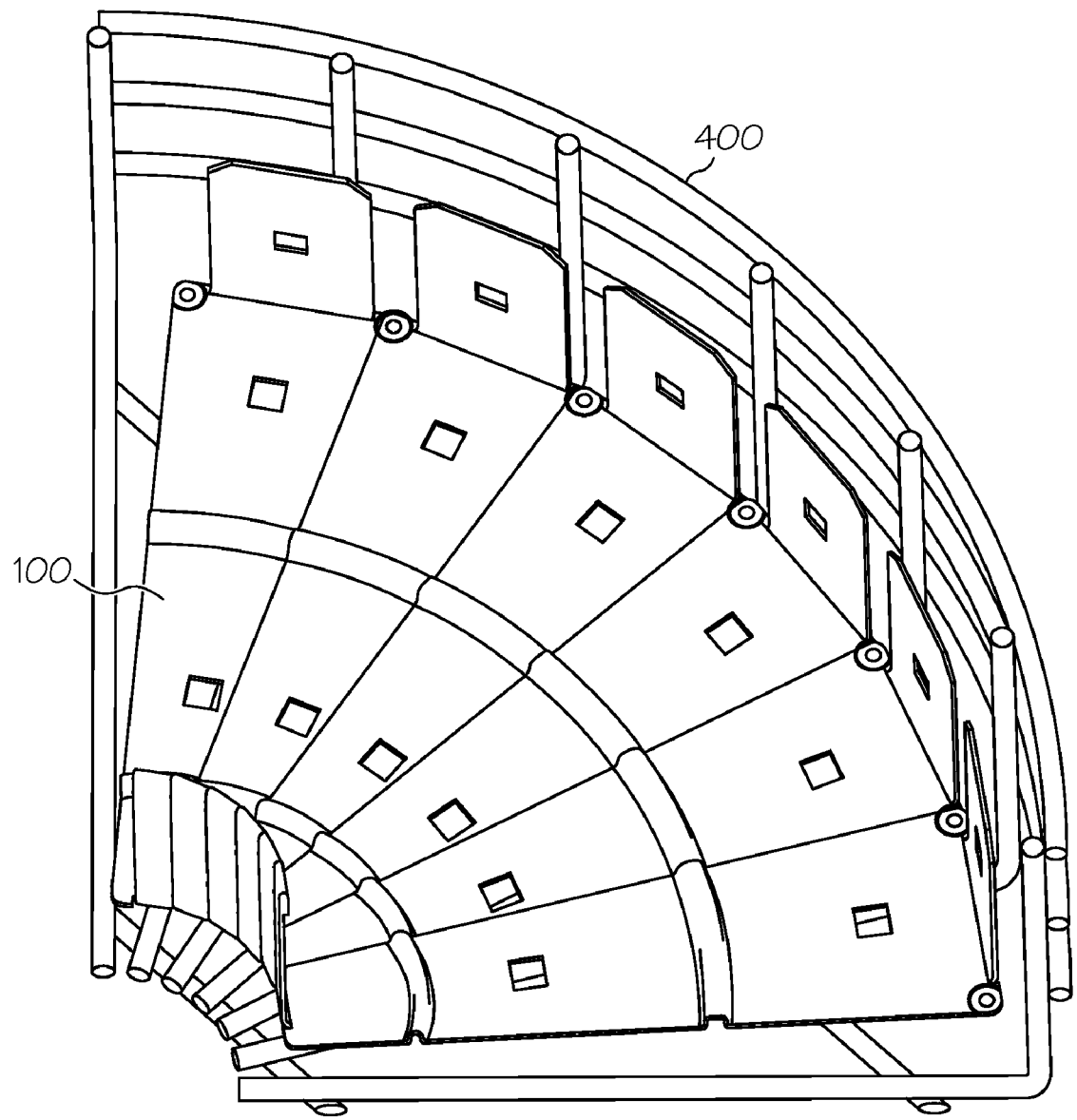
FIG. 4 illustrates a plurality of wedge-shaped pieces forming the bend component used in conjugation with a wire mesh tray having a 90° bend according to an embodiment of the present disclosure.

In one exemplary embodiment, the interlocking wedge-shaped pieces 100 forming the component 10 may be attached to upper surface of the wire mesh cable tray 400 as shown in FIG. 4 using connectors commonly known in the art. In another exemplary embodiment, the interlocking wedge-shaped pieces 100 forming the component 10 may be attached underneath the wire mesh cable tray 400, again using connectors commonly known in the art. In another exemplary embodiment, the interlocking wedge-shaped pieces 100 forming the component 10 may be used alone, i.e., without the wire mesh cable tray. In this embodiment, special connectors may be needed to join the interlocking wedge-shaped pieces 100 forming the component 10 to straight sections of the wire mesh cable trays. Once assembled and installed, the component 10 can provide the same cross-sectional area as the original wire mesh cable tray (i.e., before the wire mesh cable tray was cut and bent) that was designed, tested and approved by the UL or CSA.

In summary, the component 10 can help maintain the EGC compliance integrity of the wire mesh cable tray system while allowing and maintaining the field installation modification flexibility of the traditional wire mesh cable tray system. The component 10 can allow the field installation technician to adapt the wire mesh cable tray system to the environment while maintaining the designed, tested and approved EGC compliance. Additionally, the component 10 can be designed to support and maintain a bend radius for the types of cables needed during and after installation.

Additionally, the wire mesh cable tray system can maintain, at all times, the conductivity and the cross-sectional area of the wire mesh cable tray system needed for EGC compliance through the use of the component 10. In addition, field installation technicians will be able to modify the bends, curves and the elevation offsets on the fly, at the field installation sites without upsetting the cross-section area and conductivity of the tested and certified wire mesh cable tray system.

It is noted that terms like "preferably," "commonly," and "typically" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure.

For the purposes of describing and defining the present disclosure it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A component for preserving equipment-grounded conductor compliance of a wire mesh cable tray system modified from its original configuration, the component comprising:
a plurality of interlockable pieces, each having (i) a wedge-shaped bottom with opposing first and second edges, (ii) a first panel projecting from the first edge of said bottom, and (iii) a second panel projecting from the second edge of said bottom, said plurality of pieces together forming a surface that, when attached to the modified wire mesh cable tray system, provides the modified wire mesh cable tray system with a cross-sectional area and electrical conductivity consistent with that of an unmodified wire mesh cable tray system;
wherein the surface is selected from a planar curved surface or a curved, helical elevation offset; and
wherein shape, curve angle, or both, of the surface may be modified by adding or removing one or more interlockable wedge-shaped pieces.

2. The component of claim 1, wherein the component is adapted to attach to a wire mesh cable tray system modified from an original configuration to form at least one bend, at least one change in elevation, or combinations thereof.

3. The component of claim 1, wherein the shape, curve angle, or both, of the surface may be modified during manufacture, in the field, or combinations thereof.

4. The component of claim 2, wherein the component is adapted to attach to modified cable trays having a bend angle of from 0° to 360°.

5. The component of claim 1, wherein the interlockable pieces are comprised of galvanized sheet metal.

6. The component of claim 5, wherein the galvanized sheet metal comprises steel or aluminium.

7. The component of claim 5, wherein the galvanized sheet metal has a thickness of about 0.05inches (about 0.127 centimeter).

8. The component of claim 1, wherein each wedge-shaped bottom has a length of about 6 inches (about 15.24 centimeters).

9. The component of claim 1, wherein the plurality of pieces are interlocked together with rivets that pass through grommets in each piece.

10. The component of claim 1, wherein the component is adapted to attach on top of the modified wire mesh cable tray, underneath the modified wire mesh cable tray, or between two sections of the modified wire mesh cable tray.

11. A component for preserving equipment-grounded conductor compliance of a wire mesh cable tray system modified from its original configuration to form one or more of bends and changes in elevation, the component comprising:

a plurality of interlocked pieces, each having (i) a wedge-shaped bottom with opposing first and second edges, (ii) a first panel projecting from the first edge of said bottom, and (iii) a second panel projecting from the second edge of said bottom, said plurality of pieces together forming a surface that, when attached to the modified wire mesh cable tray system, provides the modified wire mesh cable tray system with a cross-sectional area and electrical conductivity consistent with that of an unmodified wire mesh cable tray system;

wherein the surface is selected from a planar curved surface or a curved, helical elevation offset; and wherein shape, curve angle, or both, of the surface may be modified by addition or removal of one or more wedge-shaped pieces.

12. The component of claim 11, wherein the first edge has a width of about 0.75 inches (about 1.905 centimeters) and the second edge has a width of about 2 inches (about 5.08 centimeters).

13. The component of claim 11, further comprising at least one row of rounded indentions on, and running a width of, each wedge-shape bottom of the plurality of pieces.

14. The component of claim 11, further comprising at least one aperture on the wedge-shaped bottom of each piece of the plurality of pieces, each aperture adapted to accept and attach hardware.

15. The component of claim 11, wherein the second panel of each piece of the plurality of pieces comprises at least one perforation that is adapted to accept and attach hardware.

16. The component of claim 11, further comprising on each piece of the plurality of pieces:

a flange projecting from the top of the first panel toward the second panel, the flange adapted to create a hem and to maintain electrical conductivity between the plurality of interlocked pieces.

* * * * *